United States Patent
Yoon et al.

(10) Patent No.: US 10,147,965 B2
(45) Date of Patent: Dec. 4, 2018

(54) PRESSING JIG FOR SECONDARY BATTERY CELL

(71) Applicant: LG Chem, Ltd., Seoul (KR)

(72) Inventors: Du-Seong Yoon, Daejeon (KR); Ji-Hyun Kim, Daejeon (KR); Jae-Hyun Lee, Daejeon (KR)

(73) Assignee: LG Chem, Ltd. (KR)

( * ) Notice: Subject to any disclaimer, the term of this patent is extended or adjusted under 35 U.S.C. 154(b) by 94 days.

(21) Appl. No.: 15/525,425

(22) PCT Filed: Nov. 6, 2015

(86) PCT No.: PCT/KR2015/011931
§ 371 (c)(1),
(2) Date: May 9, 2017

(87) PCT Pub. No.: WO2016/076578
PCT Pub. Date: May 19, 2016

(65) Prior Publication Data
US 2017/0317376 A1 Nov. 2, 2017

(30) Foreign Application Priority Data
Nov. 11, 2014 (KR) .................. 10-2014-0156334

(51) Int. Cl.
*H01M 2/10* (2006.01)
*H01M 10/04* (2006.01)

(52) U.S. Cl.
CPC ..... *H01M 10/0481* (2013.01); *H01M 2/1016* (2013.01); *H01M 10/0404* (2013.01)

(58) Field of Classification Search
CPC ......... H01M 10/0481; H01M 10/0404; H01M 2/1016
See application file for complete search history.

(56) References Cited

U.S. PATENT DOCUMENTS

| 5,799,934 A * | 9/1998 | Kouda | B65G 17/32 198/690.1 |
| 2006/0200972 A1* | 9/2006 | Onishi | H01M 2/1016 29/623.1 |
| 2007/0172712 A1* | 7/2007 | Hsiao | H01M 8/248 429/508 |

(Continued)

FOREIGN PATENT DOCUMENTS

| JP | H08203555 A | 8/1996 |
| JP | 2007194216 A | 8/2007 |

(Continued)

OTHER PUBLICATIONS

Search Report from International Application No. PCT/KR2015/011931, dated Mar. 8, 2016.

*Primary Examiner* — Stewart A Fraser
(74) *Attorney, Agent, or Firm* — Lerner, David, Littenberg, Krumholz & Mentlik, LLP

(57) ABSTRACT

The present disclosure discloses a pressing jig of secondary battery cell, the pressing jig including: one pair of pressing plates hinge-coupled to be mutually foldable, and having space therebetween where the cell of the secondary battery may be disposed; and a locking mechanism configured to fixate a folded state of the one pair of pressing plates, wherein at least one of the one pair of pressing plates is made of a polyacetal (POM) material.

6 Claims, 4 Drawing Sheets

(56) References Cited

U.S. PATENT DOCUMENTS

2007/0269702 A1* 11/2007 Nakajima ............ H01M 8/0276
                                                                429/442
2008/0075842 A1    3/2008  Brewster et al.

FOREIGN PATENT DOCUMENTS

| JP | 2007299708 A | 11/2007 |
| JP | 4595307 B2 | 12/2010 |
| KR | 20010109588 A | 12/2001 |
| KR | 20080068305 A | 7/2008 |
| KR | 20090075670 A | 7/2009 |
| KR | 20100021704 A | 2/2010 |
| KR | 20130123762 A | 11/2013 |

* cited by examiner

PRESSING JIG FOR SECONDARY BATTERY CELL

CROSS-REFERENCE TO RELATED APPLICATION

This application is a national phase entry under 35 U.S.C. § 371 of International Application No. PCT/KR/2015/011931, filed Nov. 6, 2015, which claims priority to Korean Patent Application No. 10-2014-0156334, filed Nov. 11, 2014, the disclosure of which is incorporated herein by reference.

TECHNICAL FIELD

The present disclosure relates to a pressing jig for secondary battery cell, and more particularly, to a pressing jig for secondary battery cell, that presses the cell during an activation process regarding the cell for the secondary battery to restrict increase of thickness.

BACKGROUND ART

Secondary batteries may be classified into can-type secondary batteries where an electrode assembly is embedded in a cylindrical-type or rectangular-type metal can, and pouch-type secondary batteries where an electrode assembly is embedded in a pouch of an aluminum laminate sheet.

Especially, since the pouch-type secondary battery uses a pouch case made of a soft sheet material, it has advantages that allow diversification of product forms and facilitate miniaturization.

In general, the pouch-type secondary battery is fabricated through a process of assembling a cell and a process of activating the cell and the like, and in the cell activation process, the cell is mounted onto a certain jig for smooth conduction of current, and processes of charging, discharging and the like are performed under conditions required for the activation. The jig is used for a purpose of testing the performance of a fabricated secondary battery beforehand. Recently, as the application fields of the secondary battery are becoming extremely diverse, cells of various sizes and structures are being fabricated, and in order to activate or test such cells, jigs that are suitable thereto must be used.

A technique related to the jig of the battery cell is disclosed in, for example, Korean Laid-open Patent Publication No. 2008-0068305 and in Japanese Laid-open Patent Publication No. 2007-194216.

Korean Laid-open Patent Publication No. 2008-0068305 proposes a jig for charging and discharging of a plate shape secondary battery, consisting of a first member where an upper electrode terminal portion is located and a second member where a lower electrode terminal portion is located in a state where a battery cell is mounted, and where the members have a combined structure that may be changed in a longitudinal direction of the battery cell. According to this jig for charging and discharging, it is possible to perform charging and discharging for activation of the battery cell regardless of the size of the battery cell or location of the electrode terminal, or test the performance of the battery cell, and minimize damage to the battery cell caused by heat generated in the process of charging and discharging.

Japanese Laid-open Patent Publication No. 2007-194216 relates to a controllable pressing tool of fuel cell, and proposes a controllable pressing jig of a fuel cell group that supplies an optimal contact pressure to the fuel cell group or a fuel cell stack by a controllable pressure source.

Meanwhile, the cell of the pouch-type secondary battery cell requires a pressing jig that is capable of restricting increase of thickness due to expansion of the cell in the activation process. However, a conventional pressing jig is made of heavy metal, which is not easy to use and handle, and is difficult to be applied to an automated process, and therefore needs improvement.

DISCLOSURE

Technical Problem

The present disclosure is designed to solve the problems of the related art, and therefore the present disclosure is directed to providing a pressing jig of a secondary battery cell, having a structure reduced in weight such that it is convenient to use and handle and easily applicable to automated processes.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a pressing jig of secondary battery cell, the pressing jig including: one pair of pressing plates hinge-coupled to be mutually foldable, and having space therebetween where the cell of the secondary battery may be disposed; and a locking mechanism configured to fixate a folded state of the one pair of pressing plates, wherein at least one of the one pair of pressing plates is made of a polyacetal (POM) material.

It is preferable that a hinge member is provided at a lower end edge portion of the one pair of pressing plates, and that the locking mechanism is located at an upper portion of the one pair of pressing plates.

The locking mechanism may have a supporting rod fitted to any one pressing plate of the one pair of pressing plates and disposed to traverse the other pressing plate in a thickness direction in a state where the one pair of pressing plates are folded; and a C-type retaining ring fastened to the supporting rod on an outer face side of the other pressing plate.

It is preferable that the supporting rod is installed to be separable in the thickness direction of the one pair of pressing plates.

The one pair of pressing plates may have a pressing unit configured to face the cell disposed therebetween and to surface-contact the cell when the thickness of the cell increases due to an activation process, and a supporting unit located at an upper end of the pressing unit and having a greater width than the pressing unit, and the supporting rod may each be coupled one by one at both ends in a width direction of the supporting unit in a state where the one pair of pressing plates are folded.

It is preferable that the hinge member is located at a lower end of the pressing unit and has a greater width than the pressing unit.

Advantageous Effects

The present disclosure gives the following effects.

A cell pressing jig according to an embodiment of the present disclosure may be remarkably reduced in weight as compared with an existing cell pressing jig of a simple metal material.

Further, a cell pressing jig according to the present disclosure has a folding-type operating method and a locking mechanism optimized thereto, thereby conveniently providing pressing functions regarding the cell.

DESCRIPTION OF DRAWINGS

Other objects and aspects of the present disclosure will become apparent from the following descriptions of the embodiments with reference to the accompanying drawings in which.

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
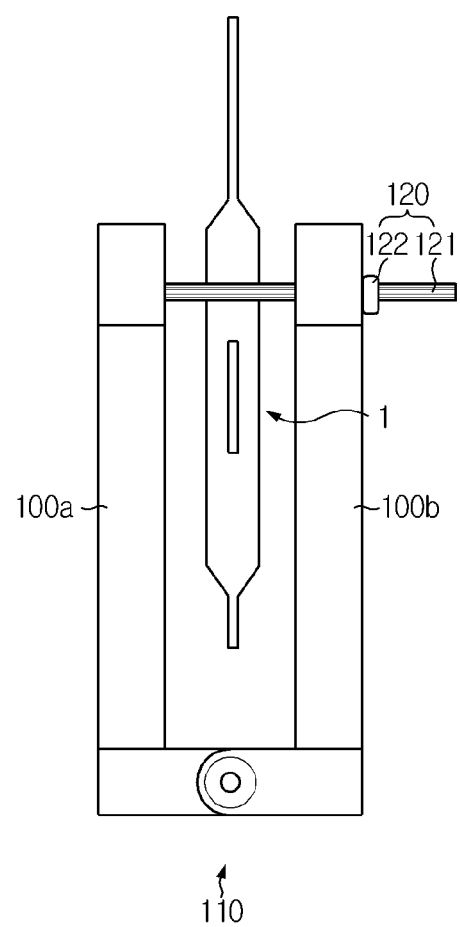
FIG. 1 is a side view illustrating an example where a secondary battery cell is disposed on a pressing jig according to a preferable embodiment of the present disclosure.

FIG. 1 is a side view illustrating an example where a secondary battery cell is disposed on a pressing jig according to a preferable embodiment of the present disclosure.

Referring to FIG. 1, the pressing jig according to the preferable embodiment of the present disclosure includes one pair of pressing plates 100a, 100b hinge-coupled such that they may be folded, and a locking mechanism 120 configured to fixate the folded state of the one pair of pressing plates 100a, 100b.

The one pair of pressing plates 100a, 100b are hinge-coupled to be mutually foldable by a hinge member 110 provided at a lower end edge. In a state where the one pair of pressing plates 100a, 100b are folded, between the pressing plates 100a, 100b, a space where a cell 1 of a secondary battery may be disposed is formed. An inner width of the space where the cell 1 is disposed, that is, a gap between the pressing plates 100a, 100b restricts increase of thickness of the cell 1 during activation of the cell 1 within a determined range.

It is preferable that the pressing plates 100a, 100b are made of a polyacetal (POM) material that has excellent mechanical properties and may be reduced in weight.

Figure 2:
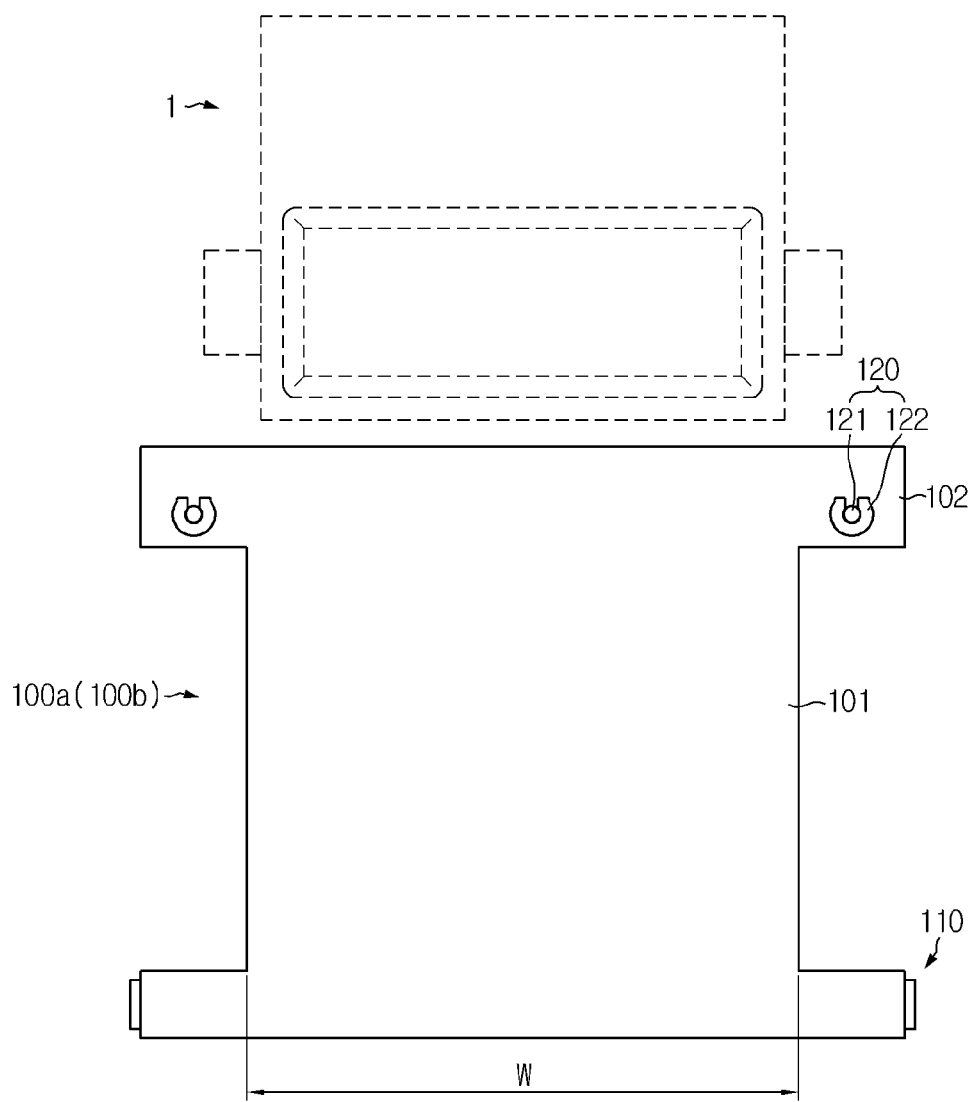
FIG. 2 is a front view of a pressing jig according to a preferable embodiment of the present disclosure.

As illustrated in FIG. 2, the pressing plates 100a, 100b has a pressing unit 101 facing the cell 1 and configured to surface-contact the cell 1 when the thickness of the cell 1 increases due to the activation process, and a supporting unit 102 provided at an upper end of the pressing unit 101 for installation of the locking mechanism 120. Here, it is preferable that the supporting unit 102 has a greater width than a width W of the pressing unit 101. According to such a configuration, it is possible to secure free space for installation of the locking mechanism 120 while also providing the supporting unit 102 only as much as a minimum surface area necessary for pressing the cell 1, thereby reducing the weight of the jig.

The hinge member 110 is located at a lower end of the pressing unit 101, and is preferably formed integrally with the pressing plates 100a, 100b. Here, it is preferable that the hinge member 110 has a greater width than the pressing unit 101, just as the supporting unit 102.

The locking mechanism 120 has a supporting rod 121 of a metal material that may traverse the one pair of pressing plates 100a, 100b in a jig folded state, and a C-type retaining ring 122 fastened to the supporting rod 121.

The supporting rod 121 is fitted to any one pressing plate 100a of the one pair of pressing plates 100a, 100b by being pressed-in and the like, and is disposed to traverse the other pressing plate 100b in the thickness direction in the jig folded state. Specifically, as the supporting rod 121 is fitted in the thickness direction of the one pair of pressing plates 100a, 100b, it supports the folded state between the pressing plates 100a, 100b, and is separated as it falls out in reverse direction from the pressing plate 100b coupled to at least a front side of the supporting rod 121.

The supporting rod 121 is each coupled one by one at both ends in a width direction of the supporting unit 102 in the state where the one pair of pressing plates 100a, 100b are folded.

The C-type retaining ring 122 is fastened to the supporting rod 121 on an outer face side of the pressing plate 100b coupled to the front side of the supporting rod 121 to fixate the fastened state of the supporting rod 121. For such a C-type retaining ring 122, a conventional retaining ring substantially having the shape of 'C' may be adopted. Although not illustrated in the drawings, preferably, along a circumference of the supporting rod 121, a groove where the C-type retaining ring 122 may be assembled is provided.

Figure 3:
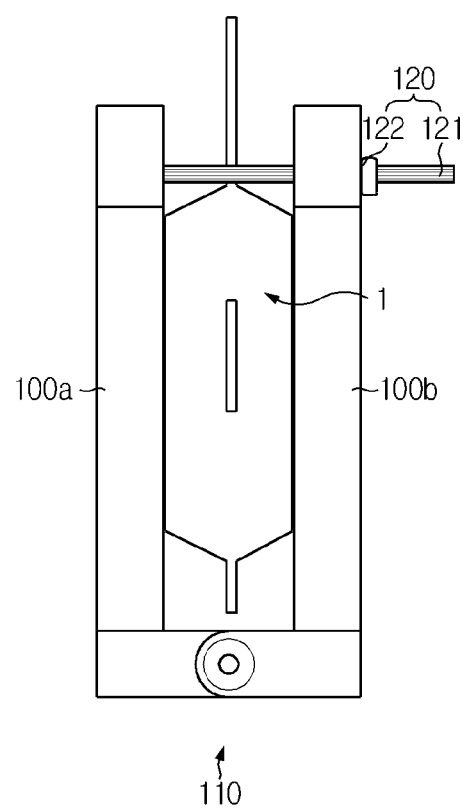
FIG. 3 is a side view illustrating a state where the cell is expanded by an activation process in FIG. 1.
Figure 4:
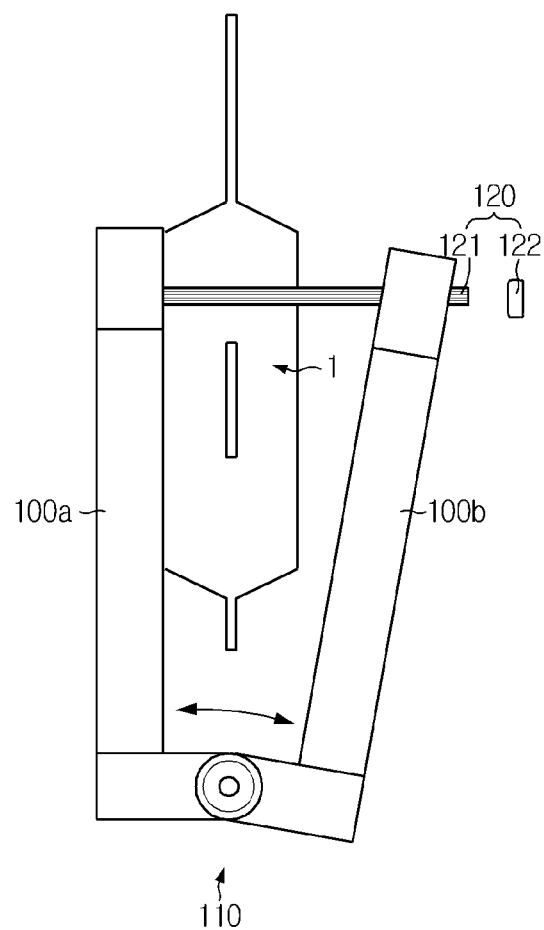
FIG. 4 is a side view illustrating a state where the jig is unfolded in order to separate the cell in FIG. 3.

In FIG. 3 and FIG. 4, a function and use example of the pressing jig according to a preferable embodiment of the present disclosure are illustrated.

As illustrated in FIG. 3, when a cell 1 is disposed inside the pressing jig and an injection, activation and aging process is proceeded regarding the cell 1 in a state where the locking mechanism 120 is locked, the cell 1 expands, increasing its thickness.

Since the pressing jig has one pair of pressing plates 100a, 100b disposed to face both surfaces of the cell 1, the increase of thickness of the cell 1 is restricted by the pressing plates 100a, 100b.

The one pair of pressing plates 100a, 100b are made of a polyacetal (POM) material and are coupled to each other by the hinge member 110, and are thus reduced in weight, making them convenient to handle and easy to dispose to face both surfaces of the cell 1 when folded. In a state where the pressing plates 100a, 100b are disposed in a regular position, the locking mechanism 120 is fastened to the C-type retaining ring 122 in a state where the supporting rod 121 is fitted to traverse the pressing plates 100a, 100b, thereby turning into a locked state.

Then, before a Degas process, the cell 1 is released from the pressing jig to go through the rest of the subsequent processes. When intending to release the cell 1, as illustrated in FIG. 4, it is possible to separate the C-type retaining ring 122 from the supporting rod 121 to release the locked state of the locking mechanism 120, and unfold the pressing plates 100a, 100b and separate the cell 1.

The pressing jig according to the preferable embodiment of the present disclosure having such a configuration may be reduced in weight since the pressing plates 100a, 100b are made of the polyacetal (POM) material, and may be usefully applied to the cell activation process and the like as it adopts the folding-type operating method and the locking mechanism 120 that uses the supporting rod 121 and the C-type retaining ring 122.

The cell pressing jig according to the present disclosure may be reduced in weight, and is thus very convenient to use and handle, and may be easily applied to automated processes for activating or testing the cell.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A pressing jig of secondary battery cell, the pressing jig comprising:
   one pair of pressing plates hinge-coupled to be mutually foldable, and having space therebetween where the cell of the secondary battery may be disposed; and
   a locking mechanism configured to fixate a folded state of the one pair of pressing plates, wherein at least one of the one pair of pressing plates is made of a polyacetal (POM) material.

2. The pressing jig of secondary battery cell according to claim 1, wherein a hinge member is provided at a lower end edge portion of the one pair of pressing plates, and
   the locking mechanism is located at an upper portion of the one pair of pressing plates.

3. The pressing jig of secondary battery cell according to claim 2, wherein the locking mechanism has a supporting rod fitted to any one pressing plate of the one pair of pressing plates and disposed to traverse the other pressing plate in a thickness direction in a state where the one pair of pressing plates are folded; and
   a C-type retaining ring fastened to the supporting rod on an outer face side of the other pressing plate.

4. The pressing jig of secondary battery cell according to claim 3, wherein the supporting rod is installed to be separable in the thickness direction of the one pair of pressing plates.

5. The pressing jig of secondary battery cell according to claim 3, wherein the one pair of pressing plates have a pressing unit configured to face the cell disposed therebetween and to surface-contact the cell when the thickness of the cell increases due to an activation process, and a supporting unit located at an upper end of the pressing unit and having a greater width than the pressing unit; and
   the supporting rod is each coupled one by one at both ends in a width direction of the supporting unit in a state where the one pair of pressing plates are folded.

6. The pressing jig of secondary battery cell according to claim 5, wherein the hinge member is located at a lower end of the pressing unit and has a greater width than the pressing unit.

* * * * *